Aug. 19, 1941. C. B. BAZZONI ET AL 2,253,485
ELECTRICAL PROSPECTING METHOD AND APPARATUS
Filed Aug. 2, 1938
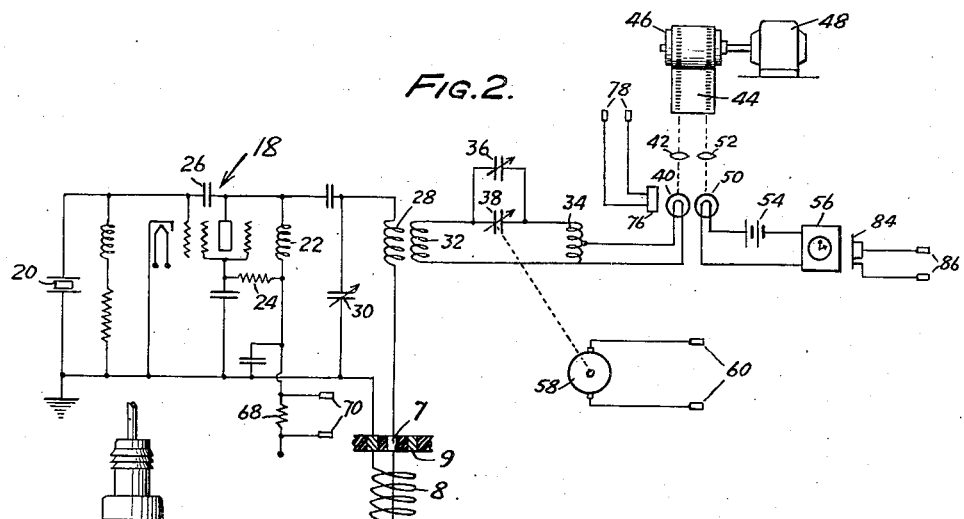
FIG.2.
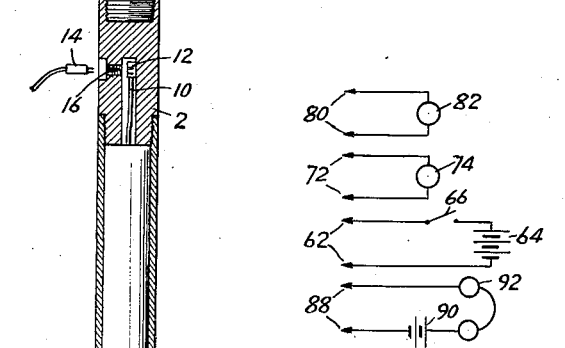
FIG.3.
FIG.5.
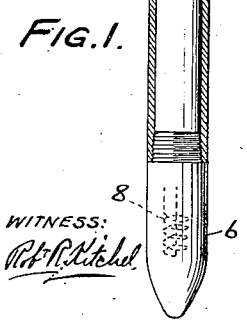
FIG.1.
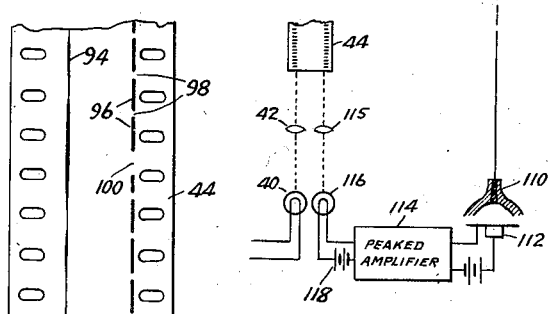
FIG.4.
INVENTORS
Charles B. Bazzoni
Joseph Razek
BY
ATTORNEYS Patented Aug. 19, 1941

2,253,485

UNITED STATES PATENT OFFICE 2,253,485

ELECTRICAL PROSPECTING METHOD AND APPARATUS

Charles B. Bazzoni, Wallingford, and Joseph Razek, Llanerch, Pa., assignors to Sperry-Sun Well Surveying Company, Philadelphia, Pa., a corporation of Delaware Application August 2, 1938, Serial No. 222,609

22 Claims. (Cl. 175—182)

This invention relates to geophysical prospecting and more particularly, by so-called electrical coring, to the determination of the nature and boundaries of formations traversed by bore holes.

In our application Serial No. 72,246, filed April 2, 1936, now Patent No. 2,167,630, there is described a method and apparatus for electrical prospecting, the method involving lowering into a bore hole an apparatus arranged to propagate high frequency oscillations into the strata surrounding the apparatus. By causing the oscillation producing apparatus to be affected by the strata in its vicinity, a measurement of the electrical conditions of the apparatus will give an indication of the formations which are encountered. Instead of having the oscillation producing apparatus affected by the field it produces, a separate detecting means may be provided to record, for example, the intensity of the field in a given location in the vicinity, thereby also securing an indication of the strata through which the apparatus is passing. The various matters to be taken into account are fully described in said application, and reference is made thereto for a more general description of the problems which arise.

The general object of the present invention is to improve the method and apparatus of said prior application.

Among the features of the present invention there may be noted an improved recording arrangement whereby there may be secured in a highly sensitive fashion indications of the variations in the electrical properties of the strata traversed. Specifically, this is accomplished by the provision of an improved circuit arrangement.

Another object of the invention relates to the provision of means for monitoring and adjusting the apparatus after it is ready for the descent into the bore hole. As might be expected with a sensitive high frequency apparatus, it is difficult to adjust the apparatus before it is placed within its casing, and before the casing is surrounded by a conducting medium, in such fashion that it will perform its function properly during its descent through the portion of the bore hole in which records are to be made. Consequently, it is an object of the invention to provide means for insuring that the apparatus is working properly before it is lowered into the bore hole, the means specifically giving access for monitoring and adjusting purposes for the apparatus while it is within its outer protective casing and while it may be submerged in a conducting fluid to simulate the conditions encountered on descent into the hole.

Still another object of the invention is the provision of improved means for correlating the records made by the apparatus with the depth at which they are made. Specifically, in accordance with the invention, this may be accomplished by transmitting signals from the surface when measuring means at the surface indicates that the apparatus has reached the predetermined depths.

The above and other objects of the invention, particularly relating to details, will be apparent from the following description read in conjunction with the accompanying drawing, in which:

Figure 1 is a sectional view showing the protective casing of the apparatus, the field producing means thereof, the interior apparatus, and the monitoring and adjusting means;

Figure 2 is a diagram showing the wiring of the apparatus and also the recording devices thereof;

Figure 3 is a wiring diagram illustrating the connections to a monitoring and adjusting plug arrangement;

Figure 4 is a fragmentary plan view of a portion of a developed film illustrating the type of record made in the apparatus; and Figure 5 is a diagrammatic view illustrating a modified arrangement for the correlation of the records with depth.

Referring first to Figure 1, the protective casing of the instrument, made to withstand the enormous pressures encountered in deep holes, is illustrated at 2. This casing contains interior apparatus indicated generally at 4 and comprising an oscillator, recording mechanism and electrical power supplies therefor. At the lower end of the protective casing there is located a nose 6, of nonconducting material such as Bakelite, in which there is imbedded a coil 8 which provides for the propagation of a high frequency field in the surrounding strata. Instead of a coil such as 8, it will be obvious that a suitable antenna arrangement may be employed as discussed in our earlier application. The leads from the coil or antenna preferably pass, respectively, to a central plug 7 and an annular ring 9, mounted in an insulating plug in the lower portion of the protective casing as indicated diagrammatically in Figure 2. By the use of this concentric arrangement, there is avoided a considerable inductance such as will result if the leads pass through openings in an iron casing.

In the upper portion of the protective casing, connected by a cable 10 to the apparatus within the casing, there is a socket member 12 having a number of sockets adapted to be engaged by the prongs of a plug indicated at 14, which when the apparatus is being adjusted may be inserted through a tapped opening 16, which is later to be closed by a fluid-tight plug when the apparatus is lowered in a hole.

The oscillator constituting the field producing means of the apparatus comprises a tube 18 preferably of the pentode, or equivalent beam power, type. The oscillating circuit of this tube is substantially conventional, the frequency being determined by means of a crystal 20. Plate current is supplied through a choke 22 and screen current through a voltage drop resistor 24. A small condenser 26 between the grid and plate of the tube may be provided to secure the feed-back necessary for oscillation. The tank circuit of the oscillator includes in series the coil 8 and a second coil 28, in parallel with a condenser 30, which is desirably variable for initial adjustment. Coupled to the coil 28 there is a wave meter circuit comprising two coils 32 and 34 and a pair of condensers 36 and 38 in parallel. The former of these is the main adjusting condenser, while the latter is a trimmer condenser adapted to be adjusted as indicated hereafter. Coupled to the wave meter circuit is a recording lamp 40, which is arranged to project a spot of light through an optical system indicated at 42 upon a continuously slowly moving film 44, arranged to be wound upon a reel 46 by means of a motor and gear reduction arrangement indicated at 48.

A second lamp 50 is provided for timing purposes, this lamp being adapted to project upon the film 44 a spot of light through an optical system indicated at 52. The lamp 50 is energized by a battery 54, the circuit being controlled by a clockwork switch arrangement indicated at 56, which is adapted to interrupt the current through the lamp 50 periodically so as to give timing marks as hereafter described.

In the operation of the apparatus all the parts are set in adjustment as indicated hereafter, and the apparatus is lowered down the hole. Under these circumstances, the illumination of the lamp 40 varies as different strata are encountered in the vicinity of the coil 8 with the resultant production of a record of varying density on the film as indicated at 94. Simultaneously, a timing record is produced as indicated at 96, this timing record preferably having short interruptions made at definite intervals, as indicate at 98, with periodic longer interruptions, as indicated at 100, say at every tenth interruption, in order to faciliate counting. By correlating the making of the timing marks with a watch at the surface before the instrument is lowered and noting the depths reached at different times, it will be obvious that the records provided by the variable density track 94 may be readily correlated with the depths at which they are produced.

The timing trace has an additional function in permitting a check to be made as to whether the variable density of the recording trace may be partially or wholly due to variations in speed of feed of the film. It is rather difficult to secure a uniform speed of movement of the film, and the necessity for uniform speed may be obviated if in analyzing the record comparative measurements are made of the density of the record track and the timing track. If, for example, an increase of density is due to slowing down of the film, the increased density will show in both tracks, and by comparative measurements errors due to variations in film speed may be eliminated. This may be accomplished, for example, by scanning simultaneously both tracks by means of the device disclosed in our application Serial No. 222,610, filed August 2, 1938, now Patent No. 2,222,136. Of course, if precautions are taken to secure a substantially constant rate of feed of the film the interpretation may involve merely the measurement of density of the recording track.

The adjustment of a sensitive apparatus of this character is difficult, and for that purpose there is provided the plug and socket arrangement described above. The primary adjustment necessary after the apparatus is placed under conditions simulating those in the bore hole after assembly is complete is that of the trimming condenser 38, which is accordingly coupled by means of a shaft to a motor and reduction gearing assembly indicated at 58. The motor leads are connected to the sockets 60 in the socket member 12. The plug 14 carries two corresponding prongs 62 arranged in series with a motor-driving battery 64 and a switch 66. By manipulation of the switch 66 when the plug is located in its socket the plates of the condenser 38 may be rotated to adjust its capacity.

It is also necessary to know whether the circuit is oscillating properly. This is determined by providing in series with the plate power lead a small resistance 68 to the ends of which are connected the sockets 70 adapted to be engaged by the prongs 72 of the plug 14 connected to a milliameter 74.

In order to determine whether the recording light is illuminated a photoelectric cell is provided adjacent it as indicated at 76 connected to sockets 78 adapted to receive prongs 80 connected to the leads of a microammeter 82. It is also desirable to know whether the timing apparatus is operating, and also to correlate it with a timepiece at the surface. For this purpose it would be possible to use another photoelectric cell such as 76 in the vicinity of the lamp 50 so as to record the instants when the lamp is extinguished. However, it is more useful to provide in the vicinity of the clockwork mechanism a microphone such as 84 connected to the sockets 86 adapted to receive the prongs 88 connected to a battery 90 and phones 92. With the above testing arrangements, assuming that the apparatus is set in approximately proper adjustment before being placed in the casing, its final condition of operation may be determined after the casing is completely closed with the exception of the restricted opening 16, the closing of which will make no perceptible difference in the operation of the apparatus. During the final adjustments, the apparatus is preferably immersed up to substantially its upper end in a liquid such as a salt solution which experience indicates will provide for the particular apparatus under consideration substantially the same conditions as will be encountered when the apparatus is within the deeper portions of a bore hole, below the surface casing, where it is to make its records. With the apparatus thus under conditions substantially equivalent to those of its operation, the prongs of the plug 14 may be inserted in the corresponding sockets of the socket member 12. The milliammeter 74 will indicate whether or not the oscillating circuit is operating properly, inasmuch as with a circuit of the type indicated the plate current shows a substantial drop from its non-oscillating condition. It may be remarked that it is very likely that if the oscillator is oscillating when the coil 8 is immersed in a conducting medium, it will not oscillate prior to such immersion when the coil is in the air. Consequently, the initial adjustment of the oscillator before it is lowered is that which experience indicates will result in oscillation when immersion takes place. In general, unless some unforeseen conditions arise, the preliminary adjustment for proper oscillation may be made before the apparatus is in its protective casing, and consequently it is not worth while to provide for external manipulation of the condenser 30 when the apparatus is in its casing, though if desired, a trimmer condenser in parallel with a main condenser such as 30 may be operated by a motor such as 58.

Assuming that a proper oscillating condition is found to exist, the observer may then examine the reading of the microammeter 82, which records the intensity of the lamp 40. The intensity of this lamp is a very sensitive reflection of the surroundings of the coil 8 and, in general, it is likely that adjustment must be made to secure a proper condition of illumination of this lamp. To effect this, the operator may manipulate the key 66 so as to adjust the condenser 38 to the proper value to secure the desired illumination of the recording lamp. Following such adjustment reference may again be made to the milliammeter 74 to determine if the oscillating conditions are still proper. Preferably, the coupling between 28 and 32 is relatively loose so that the oscillator adjustment is not greatly affected by relatively slight tuning of the wave meter circuit by which the recording lamp is fed.

Following such adjustments, the operator may listen to the apparatus by means of the phones 92. In general, the microphone should be so located and the parts so designed that audible indications of proper operation will be given. For example, if the motor 48 is properly operating, the sound of its rotation and the reduction gear may be heard in the phones. If the switch 56 has snap type contacts, clicks will be heard upon the making and breaking of the circuit and the operator can easily distinguish the occurrence of the longer interruptions indicated at 100. By waiting for such an interruption to occur and noting the time on a watch at the surface, the correlation of the records with time, and hence with depth, may be accomplished. After all of the adjustments are made under the simulated operating conditions, the plug 14 may be removed and the opening 16 closed and the apparatus lowered to secure the desired records.

The recording circuit heretofore described is noteworthy in that the illumination of the recording lamp 40 is due to several factors, namely, the tuning of the wave meter circuit, the combination of the tuned wave meter circuit with the tank circuit, which is variably tuned due to the passage of the coil 8 through different formations, and third the variations in the tank circuit current because of the variation of tuning of it with respect to the fixed high frequency of the crystal 20. The circuit thus provided is particularly stable, and nevertheless, sensitive. Desirably, operation is on the steep portion of the characteristic response curve of the type discussed in our prior application. The sensitivity may be increased or decreased at will, however, by the relative adjustments of the circuits, particularly sensitive indications being obtained if, corresponding to maximum current in the tank circuit, there is also maximum current in the wave meter circuit, this circuit being tuned to resonance at a high frequency exactly or approximating that of the generator. The relative tuning of such circuits for the most desirable conditions involves merely the application of well known properties of coupled circuits and need not be described herein in detail.

While correlation of the records with depth may be accomplished in the fashion heretofore described, it is also possible to secure correlation by means of signals from the surface. An arrangement for doing this is diagrammatically illustrated in Figure 5, in which the recording devices may be the same as those of Figure 2, involving the projection of a spot of light on a film 44 by the use of a recording lamp 40 and optical system 42. In accordance with Figure 5, however, the correlating arrangement comprises the sending of elastic waves, i. e., sound waves or supersonic waves, down the supporting wire or cable 102. Preferably, 102 is a steel wire of the minimum cross-section consistent with safe support of the apparatus and is engaged in the top of the apparatus as indicated at 110, for example, by means of a tapered plug so that waves travelling lengthwise of it will be imparted to a maximum degree to the casing. The supporting wire 102 is carried by the conventional reel, not shown. Between the reel and the well it is tightly engaged between two rollers, one of which, indicated at 104, is mounted on the end of an elastic bar adapted to be vibrated by means of a loud speaker motor arrangement conventionally indicated at 106 and energized by an oscillator 108 controlled by a key 109. The oscillator is arranged to impart a frequency to the support 105, the roller 104 and thence to the wire 102 such that sufficiently intense waves will be imparted to the wire to enable them to be detected within the apparatus.

In the apparatus, adjacent its upper end, there is located a microphone 112, the output of which is fed into a peaked amplifier 114 of high gain type arranged to energize a marking lamp 116 which, through an optical system represented at 115, projects an image upon the film. The peaked amplifier 114 is desirably sharply tuned to the frequency of the oscillator 108 so that there will be passed by it only a very narrow band of frequencies so as to eliminate accidental energization of the lamp 116 due to vibrations of the supporting wire acting as a string, or other vibrations which may be propagated downwardly through the wire from operating machinery.

The use of the apparatus of Figure 5 will be quite clear. An observer at the surface reading a measuring device for the line may note, for example, the playing out of every ten feet thereof. As each such length passes, the operator may depress the key 109 for a period of one or two seconds, with the result that the lamp 116 will be illuminated and cause a spot of light to appear upon the film 44. Periodically, for example, every hundred feet, the operator may send a somewhat different signal, for example, two dashes so as to facilitate the ultimate reading of the record. The depth of the instrument may thus be recorded directly opposite the record of the variations of the formations encountered. It is desirable to use a small filament type lamp at 116, since such a lamp will not be illuminated to produce a depth indicating mark, at least to any such degree as will produce a record, by transient disturbances which may pass through the amplifier. A quite small, but nevertheless appreciable, time of flow of current through the lamp is necessary to illuminate it or change the intensity of its illumination, and by the use of an oscillator capable of sending out a sustained sound wave and a peaked amplifier the lamp will be substantially non-responsive to any sounds picked up by the microphone except those of the frequency used for signalling.

The lamp 116 may not only be subjected to the output of the amplifier 114, but may be constantly dimly illuminated to a desired degree by means of a battery 118. By reason of such arrangement, the depth trace may comprise a generally constant density line punctuated by marks of increased intensity corresponding to manipulations of the signalling apparatus. By comparing the substantially constant density regions of this trace with the variations of the trace produced by the lamp 40, indication may be had of variations of density of the latter trace due to fluctuations in speed of the film. This may be accomplished by the use of the apparatus disclosed in our application Serial No. 222,610 mentioned above.

It will be clear that numerous other devices may be used for securing records of the depth by control at the surface. For example, a heavy current sent through even an uninsulated cable will produce at the instrument a sufficiently large potential difference between the cable and the instrument casing to be detectable and used with amplification for marking purposes. Direct current or relatively low frequency alternating current may be employed for such signal.

What we claim and desire to protect by Letters Patent is:

1. Means for determining the location and character of formations penetrated by a bore hole comprising an exploring unit, said exploring unit including a generator of high frequency oscillations, means for establishing thereby an electromagnetic field penetrating formations in the vicinity of the bore hole, said last named means forming a part of a tuned portion of the generator circuit, and means responsive to variations in operation of the generator circuit due to change of impedance of the field establishing means resulting from different materials in the vicinity thereof, said responsive means including a tuned wavemeter circuit containing an indicating device and coupled to the generator circuit; and means for supporting said unit for movement within and lengthwise of the bore hole.

2. Means for determining the location and character of formations penetrated by a bore hole comprising an exploring unit, said exploring unit including a generator of high frequency oscillations, means for establishing thereby an electromagnetic field penetrating formations in the vicinity of the bore hole, said last named means forming a part of a tuned portion of the generator circuit, and means responsive to variations in operation of the generator circuit due to change of impedance of the field establishing means resulting from different materials in the vicinity thereof, said responsive means including a tuned circuit containing a lamp and coupled to the generator circuit; and means for supporting said unit for movement within and lengthwise of the bore hole.

3. Means for determining the location and character of formations penetrated by a bore hole comprising an exploring unit, said exploring unit including a generator of high frequency oscillations, means for establishing thereby an electromagnetic field penetrating formations in the vicinity of the bore hole, and means responsive to different materials penetrated by said electromagnetic field, said responsive means including a circuit containing an indicating device and tuned to resonance at a frequency approximating that of said generator; and means for supporting said unit for movement within and lengthwise of the bore hole.

4. Means for determining the location and character of formations penetrated by a bore hole comprising an exploring unit, said exploring unit including a generator of high frequency oscillations, means for establishing thereby an electromagnetic field penetrating formations in the vicinity of the bore hole, and means responsive to different materials penetrated by said electromagnetic field, said responsive means including a circuit containing a lamp and tuned to resonance at a frequency approximating that of said generator; and means for supporting said unit for movement within and lengthwise of the bore hole.

5. Means for determining the location and character of formations penetrated by a bore hole comprising an exploring unit, said exploring unit including a generator of high frequency oscillations, means for establishing thereby an electromagnetic field penetrating formations in the vicinity of the bore hole, said last named means forming a part of a tuned portion of the generator circuits, and means responsive to variations in operation of the generator circuit due to change of impedance of the field establishing means resulting from different materials in the vicinity thereof, said responsive means including a tuned circuit containing an indicating device and coupled to the generator circuit; and means for supporting said unit for movement within and lengthwise of the bore hole; and means for producing records of the responses of said responsive means.

6. Means for determining the location and character of formations penetrated by a bore hole comprising a generator of high frequency oscillations; means for establishing thereby a localized electromagnetic field penetrating strata in the vicinity of the bore hole; means for moving said field establishing means lengthwise of the bore hole; and means responsive to different materials penetrated by said electromagnetic field, said responsive means including a circuit containing an indicating device and tuned to resonance at a frequency approximately that of said generator.

7. Means for determining the location and character of formations penetrated by a bore hole comprising a generator of high frequency oscillations; means for establishing thereby an electromagnetic field penetrating strata in the vicinity of the bore hole; means responsive to different materials penetrated by said electromagnetic field, said responsive means including a circuit containing an indicating device and tuned to resonance at a frequency approximately that of said generator; and means for moving said responsive means lengthwise of the bore hole.

8. Means for determining the location and character of formations penetrated by a bore hole comprising an exploring unit, said exploring unit including a crystal controlled generator of high frequency oscillations, means for establishing thereby an electromagnetic field penetrating formations in the vicinity of the bore hole, said last named means forming a part of the tuned portion of the generator circuit, and means responsive to variations in operation of the generator circuit due to changes of impedance of the field establishing means resulting from different materials in the vicinity thereof, said responsive means including a tuned circuit containing an indication device and coupled to the generator circuit; and means for supporting said unit for movement within and lengthwise of the bore hole.

9. Means for determining the location and character of strata penetrated by a bore hole comprising an exploring unit, and means for supporting said unit for movement within and lengthwise of the bore hole; said exploring unit including a generator of high frequency oscillations, means for establishing thereby an electromagnetic field penetrating strata in the vicinity of the bore hole, means responsive to varying effects upon said field of materials in the vicinity of the field establishing means, means for producing records of the responses of said responsive means, and a protective casing housing said generator, responsive means and record producing means; and monitoring means arranged for temporary association with the apparatus within the casing for checking the operation of such apparatus.

10. Means for determining the location and character of strata penetrated by a bore hole comprising an exploring unit, and means for supporting said unit for movement within and lengthwise of the bore hole; said exploring unit including a generator of high frequency oscillations, means for establishing thereby an electromagnetic field penetrating strata in the vicinity of the bore hole, means responsive to varying effects upon said field of materials in the vicinity of the field establishing means, means for producing records of the responses of said responsive means, and a protective casing housing said generator, responsive means, and record producing means, the apparatus within the casing including an adjustable element; and means arranged for temporary association with the apparatus within the casing for adjusting said element.

11. Means for determining the location and character of strata penetrated by a bore hole comprising an exploring unit, and means for supporting said unit for movement within and lengthwise of the bore hole; said exploring unit including a generator of high frequency oscillations, means for establishing thereby an electromagnetic field penetrating strata in the vicinity of the bore hole, means responsive to varying effects upon said field of materials in the vicinity of the field establishing means, means for producing records of the responses of said responsive means and a protective casing housing said generator, responsive means, and record producing means, the apparatus within the casing including an adjustable element; and monitoring means arranged for temporary association with the apparatus within the casing for adjusting said element and for checking the operation of such apparatus.

12. Means for determining the location and character of strata penetrated by a bore hole comprising an exploring unit, and means for supporting said unit for movement within and lengthwise of the bore hole; said exploring unit including localized detecting means, means responsive to the characteristics of strata in the locality of the detecting means, means for recording the responses of said responsive means, and a protective casing housing said responsive and recording means; and monitoring means arranged for temporary association with the apparatus within the casing for checking the operation of such apparatus.

13. Means for determining the location and character of strata penetrated by a bore hole comprising an exploring unit, and means for supporting said unit for movement within and lengthwise of the bore hole; said exploring unit including localized detecting means, means responsive to the characteristics of strata in the locality of the detecting means, means for recording the responses of said responsive means, and a protective casing housing said responsive and recording means, the apparatus within the casing including an adjustable element; and means arranged for temporary association with the apparatus within the casing for adjusting said element.

14. Means for determining the location and character of strata penetrated by a bore hole comprising an exploring unit, and means for supporting said unit for movement within and lengthwise of the bore hole; said exploring unit including localized detecting means, means responsive to the characteristics of strata in the locality of the detecting means, means for recording the responses of said responsive means, and a protective casing housing said responsive and recording means, the apparatus within the casing including an adjustable element, and monitoring means arranged for temporary association with the apparatus within the casing for adjusting said element and for checking the operation of such apparatus.

15. Means for determining the location and character of strata penetrated by a bore hole comprising means for detecting characteristics of strata in its vicinity, means for supporting said detecting means for movement within and lengthwise of the bore hole, means for automatically recording said characteristics as the detecting means passes through various strata, a protective casing housing said recording means, and monitoring means arranged for temporary association with the apparatus within the casing for checking the operation of such apparatus.

16. Means for determining the location and character of strata penetrated by a bore hole comprising means for establishing artificial conditions in strata in the vicinity of the bore hole, means effective, when said conditions are established, to detect the characteristics of the strata in its vicinity subjected to the conditions, means for supporting said detecting means for movement within and lengthwise of the bore hole, means for automatically recording said characteristics as the detecting means passes through various strata, a protective casing housing said recording means, and monitoring means arranged for temporary association with the apparatus within the casing for checking the operation of such apparatus.

17. Means for determining the location and character of strata penetrated by a bore hole comprising means within the bore hole for establishing artificial conditions in strata in the vicinity of the said means, means effective, when said conditions are established to detect the characteristics of the strata in its vicinity subjected to the conditions, means for supporting said conditions establishing means and said detecting means for movement within and lengthwise of the bore hole, means for automatically recording said characteristics as the detecting means passes through various strata, a protective casing housing said conditions establishing means and said recording means, and monitoring means arranged for temporary association with the apparatus within the casing for checking the operation of such apparatus.

18. Means for determining the location and character of strata penetrated by a bore hole comprising an exploring unit, and means for supporting said unit for movement within and lengthwise of the bore hole; said exploring unit including means responsive to the characteristics of strata in the vicinity of the bore hole, means for recording the responses of said responsive means, and a protective casing housing said responsive means and recording means; and monitoring means arranged for temporary association with the apparatus within the casing for checking the operation of such apparatus.

19. Means for determining the location and character of strata penetrated by a bore hole comprising an exploring unit, and means for supporting said unit for movement within and lengthwise of the bore hole; said exploring unit including means responsive to the characteristics of strata in the vicinity of the bore hole, means for recording the responses of said responsive means, and a protective casing housing said responsive means and recording means, the apparatus within the casing including an adjustable element; and means arranged for temporary association with the apparatus within the casing for adjusting said element.

20. Means for determining the location and character of strata penetrated by a bore hole comprising an exploring unit, and means for supporting said unit for movement within and lengthwise of the bore hole; said exploring unit including means responsive to the characteristics of strata in the vicinity of the bore hole, means for recording the responses of said responsive means, and a protective casing housing said responsive means and recording means, the apparatus within the casing including an adjustable element, and monitoring means arranged for temporary association with the apparatus within the casing for adjusting said element and for checking the operation of such apparatus.

21. Means for determining the location and character of strata penetrated by a bore hole comprising an exploring unit, and means for supporting said unit for movement within and lengthwise of the bore hole; said exploring unit including means responsive to the characteristics of strata in the vicinity of the bore hole, means responsive to acoustic waves transmitted from the surface to said exploring unit, and means for simultaneously recording the responses of both of the last mentioned means.

22. Means for determining the location and character of strata penetrated by a bore hole comprising an exploring unit, and means for supporting said unit for movement within and lengthwise of the bore hole; said exploring unit including means responsive to the characteristics of strata in the vicinity of the bore hole, means responsive to acoustic waves transmitted from the surface to said exploring unit through said supporting means, and means for simultaneously recording the responses of both of the last mentioned means.

CHARLES B. BAZZONI.
JOSEPH RAZEK.